(12) United States Patent
Ramanath (10) Patent No.: US 11,310,802 B2
(45) Date of Patent: Apr. 19, 2022

(54) METHOD, SYSTEM AND APPARATUS FOR NETWORK ADAPTATION VIA LEARNING BASED TERRAIN SENSING

(71) Applicant: LEKHA WIRELESS SOLUTIONS PVT LTD, Bengaluru (IN)

(72) Inventor: Sreenath Ramanath, Bengaluru (IN)

(*) Notice: Subject to any disclaimer, the term of this patent is extended or adjusted under 35 U.S.C. 154(b) by 210 days.

(21) Appl. No.: 16/790,772

(22) Filed: Feb. 14, 2020

(65) Prior Publication Data

US 2020/0267717 A1   Aug. 20, 2020

(51) Int. Cl.
| | |
|---|---|
| *H04W 72/04* | (2009.01) |
| *G06N 5/04* | (2006.01) |
| *G06N 20/00* | (2019.01) |
| *H04W 88/06* | (2009.01) |
| *G06N 7/00* | (2006.01) |
| *G06N 3/04* | (2006.01) |
| *H04L 29/08* | (2006.01) |
| *G06N 3/08* | (2006.01) |

(52) U.S. Cl.
CPC ............ *H04W 72/048* (2013.01); *G06N 5/04* (2013.01); *G06N 20/00* (2019.01); *H04W 88/06* (2013.01)

(58) Field of Classification Search
CPC ...... H04W 72/048; H04W 88/06; G06N 5/04; G06N 20/00; G06N 7/0055; G06N 3/0445; G06N 3/08; H04L 67/10; H04L 67/12
See application file for complete search history.

(56) References Cited

U.S. PATENT DOCUMENTS

2019/0306030 A1\* 10/2019 Chen ..................... H04B 7/0413
2020/0211071 A1\* 7/2020 Rosas-Maxemin .... G06N 20/20

\* cited by examiner

*Primary Examiner* — Asghar H Bilgrami (57) ABSTRACT

According to an aspect, a mobile device capable of communicating with a base station using a communication mode from plurality of communication modes comprising, a set of sensors configured to provide a data representing a terrain condition of the mobile device, a distributed machine learning engine determining a first terrain state at regular interval based on a current data and a past data received from the set of sensors, and an inference unit determining a second terrain state of the mobile device from the current data and the first terrain state, wherein, the base station allocating the communication mode from plurality of communication modes based on the second terrain state.

5 Claims, 6 Drawing Sheets

METHOD, SYSTEM AND APPARATUS FOR NETWORK ADAPTATION VIA LEARNING BASED TERRAIN SENSING

CROSS REFERENCES TO RELATED APPLICATIONS

This application claims priority from Indian patent application No. 201941000746 filed on Feb. 14, 2019 which is incorporated herein in its entirety by reference.

BACKGROUND

Field of Invention

Embodiments of the present disclosure relate generally to a wireless communication and more specifically to a method, system and apparatus for network adaption such as in fifth generation new radio (5G NR) networks.

Related Art

The communication systems are deployed to operate in various configurations and modes. The configuration and modes are generally selected by a base station to provide a desired quality of service. In some cases, modes and configurations are dynamically selected to optimize the communication link. 5GNR (New Radio) is an example communication system employing dynamically selectable modes and configuration. 5GNR (New Radio) is a new radio access technology (RAT) developed by 3GPP for the 5G (fifth generation) mobile network. Some of the key features of the 5G technology mandates high data rate (2-20 Gbps), reliable/low latency communication (<1 msec) and massive machine type communications (tens of 1000 of devices). 5G NR is described in more detail in the book titled "5G NR: The Next Generation Wireless Access Technology" written by Erik dahlman, Stefan parkvall and johanSkold, the book published by Elsevier academic press, 2018 (ISBN9780128143247) and in the 5G standards: 3GPP TS 38 Series available at https://www.3gpp.org/DynaReport/38-series.htm. Both the literatures are incorporated herein by reference.

Machine learning techniques are deployed in cognitive communication system for resource scheduling, modulation detection, encoding-decoding, channel estimation, antenna sub-set selection in large MIMO etc. Several conventional machine learning techniques and their adoption in communications systems are described in the literatures listed herein, and are incorporated by reference: a) C. Jiang, H. Zhang, Y. Ren, Z. Han, K-C. Chen and Lajos Hanzo "Machine Learning Paradigms for Next-Generation Wireless Networks", IEEE Wireless Comm., 2017, Vol 24, Issue 2 pp. 98-105. b) T. J. O'Shea and J. Hoydis, "An introduction to deep learning for the physical layer", IEEE Trans. on Cognitive Comm. and Networking, Vol. 3, Issue 4, pp. 563-575, 2017. c) H. Sun et al., "Learning to optimize: Training deep neural networks for wireless resource management," ar Xiv preprint arXiv: 1705.09412, 2017. d) C. Zhang, P. Patras, and H. Haddadi, "Deep Learning in Mobile and Wireless Networking: A Survey", ar Xiv preprint arXiv: 1803.04311, 2018. e) C. Liu, J. Fang, Y. Liu and Y. Lu, "Field terrain recognition based on extreme learning theory using wavelet and texture features", Advances in Mechanical Engineering, 2018, Vol 10, pp. 1-10. f) S. Shalev-Shwartz and S. Ben-David, "Understanding Machine Learning: From Theory to Algorithms", Cambridge University Press, 2014. g) M. Ibnkahla, "Applications of neural networks to digital communications—a survey," Elsevier Signal processing, vol. 80, no. 7, pp. 1185-1215, July 2000.

SUMMARY

According to an aspect, a mobile device capable of communicating with a base station using a communication mode from plurality of communication modes comprising, a set of sensors configured to provide a data representing a terrain condition of the mobile device, a distributed machine learning engine determining a first terrain state at regular interval based on a current data and a past data received from the set of sensors, and an inference unit determining a second terrain state of the mobile device from the current data and the first terrain state, wherein, the base station allocating the communication mode from plurality of communication modes based on the second terrain state.

According to another aspect, the set of sensors comprising a camera providing a sequence of images, a audio sensor providing sound information, a signal measurement device providing signal strength information, a position sensor providing a geographical position information and a geodata providing map information, in that distributed machine learning engine employing the sequence of images, sound information and position information to determine the terrain state.

According to another aspect, the distributed machine learning engine is configured to operate in two phases, a training and a prediction phase, wherein, in the training phase a known terrain and a known sequence of images, sound information and position information are provided to generate a inference rule and classification label, and the distributed machine learning engine is configured to apply the inference rule and classification label to sequence of images, sound information and position information to predict the terrain state in the prediction phase.

According yet another aspect, the communication mode comprising a first frequency and a second frequency resource. Further the communication mode comprising of various transmission modes like transmit diversity, Open-loop and closed-loop spatial multiplexing, MU-MIMO, preceding and a beam forming.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
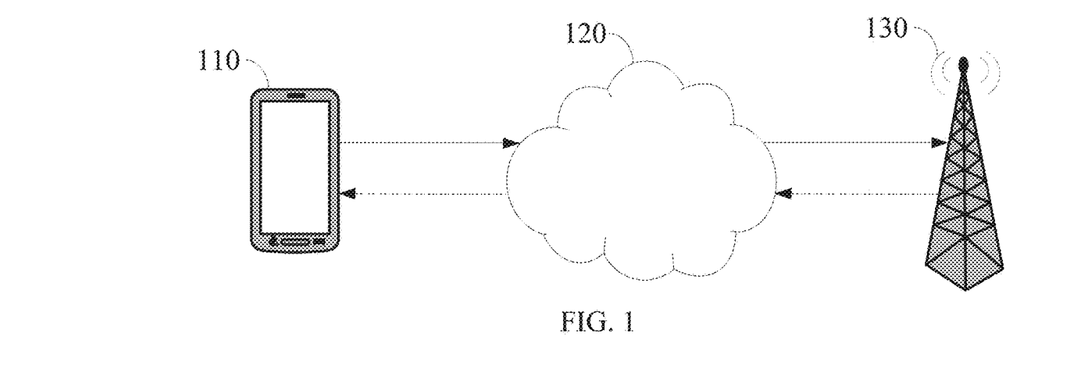
FIG. 1 is a block diagram of an example communication system (environment) in which various aspects of the present invention may be seen.

FIG. 1 is a block diagram of an example communication system (environment) in which various aspects of the present invention may be seen. The communication system 101 is shown comprising user equipment (UE) 110, communication network (CN) 120 and base station (BS) 130. Each element of the communication system is described in further detail below.

The communication network 120 facilitates communication between the UE 110 and BS 130 over a wireless communication channel. In one embodiment, the communication system selects multiple modes and configurations for establishing communication between the BS 130 and UE 110. The wireless communication channels may include for example, GSM Network, CDMA network, etc., employing protocols defined in the respective standards. In one embodiment, the communication network facilitates the communication in accordance with the protocol specified in the LTE standard in general and LTE 4G, 5G, and 5GNR (fourth generation, fifth generation (fifth generation New Radio)) in particular. Base station 130 (base stations) may be configured to provide a communication over a geographical region and referred to as cells. The network 120 deployed over the cells allow the user equipment(s) 110 to send and receive signals from the base station 130 and vice-a-versa.

Figure 2:
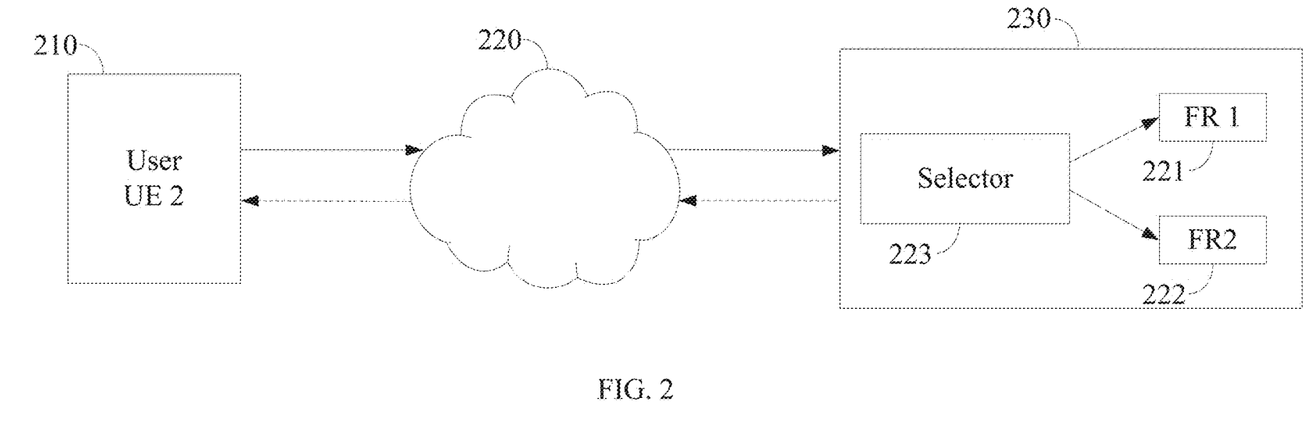
FIG. 2 is a block diagram of a communication system with multiple mode selection.

FIG. 2 is a block diagram of a communication system with multiple mode selection. As shown there the example communication system 201 is providing two radio carrier configurations as in 5G NR networks. In that, base station 230 is shown comprising Frequency resources 221 and 222, and selector 223. UE 210 and BS 230 communicate over a channel 220. At base station, the selector 223 makes decision to use and/or switch between frequencies 221 (FR1-sub-6 GHz as in 5GNR) and 222 (FR2—mmWave as in 5GNR). The base station (the selector 223) may select one of the frequency resources 221 and 222 based on the quality of service being demanded or assigned to a requesting UE 210. In one embodiment, the selection between the frequencies 221 and 222 is made based on user's location, operating condition etc. For example, for users (UE 110/210) demanding higher data rate as in small cell deployments, the frequency 222 mmWave bands (FR2) may be selected. On the other hand, for users in sub-urban, rural or sparse networks with Macro cell deployments, the frequency 221 i.e., sub-6 GHz may be selected. Though the selection modes are illustrated with two frequencies the selection may be extended to the other modes of communication including modulations, symbols, data rate, etc. in one embodiment, the selection mode may comprises various transmission modes including, SISO, transmit diversity, Open-loop and closed-loop spatial multiplexing, MU-MIMO, pre-coding and abeam forming, etc., with each term taking the usual meaning in the relevant art.

In one embodiment, the base station 130/230 receives operating condition of the user equipment 110/210 and accordingly selects a mode of communication to establish communication link between the UE 110 and BS 130. For example, when the base station 130/230 receives the operating condition of the UE 110 as urban area, the base station selects the mode 1 (frequency 222, for example) for establishing link with UE 110. Similarly, when the BS 130 receives the operating condition of UE 110 as rural/plane area, the BS 130 may select mode 2 (frequency 221) for establishing link with UE 110. In an embodiment, the UE 110 may provide the operating conditions to base station 130 over the communication channel using proprietary or standard protocol of data transfer. In one embodiment, the UE 110/210 provides the operating condition in terms of terrain state. The manner in which the UE 110/210 may determine its operating condition and send to base station is further described below.

A mobile device, (an example of UE 110/210) equipped with multi-radio access technology may comprise several sensors. For example the UE (mobile device or mobile phone for example) may comprise, video camera, audio sensor, GPS sensor, and other sensors that may capture or assist in determining the operating and surrounding condition. Enabled to sense the type of terrain and using it further in the mobile device or UE 110 to augment connectivity decisions may improve the communication system throughput. In one embodiment of the present disclosure, a machine learning based terrain sensing system is provided to sense terrain state and the terrain state information is made available to base station 130/230 so that the base station can dynamically adapt its connectivity to the best suitable mode/network.

Figure 3:
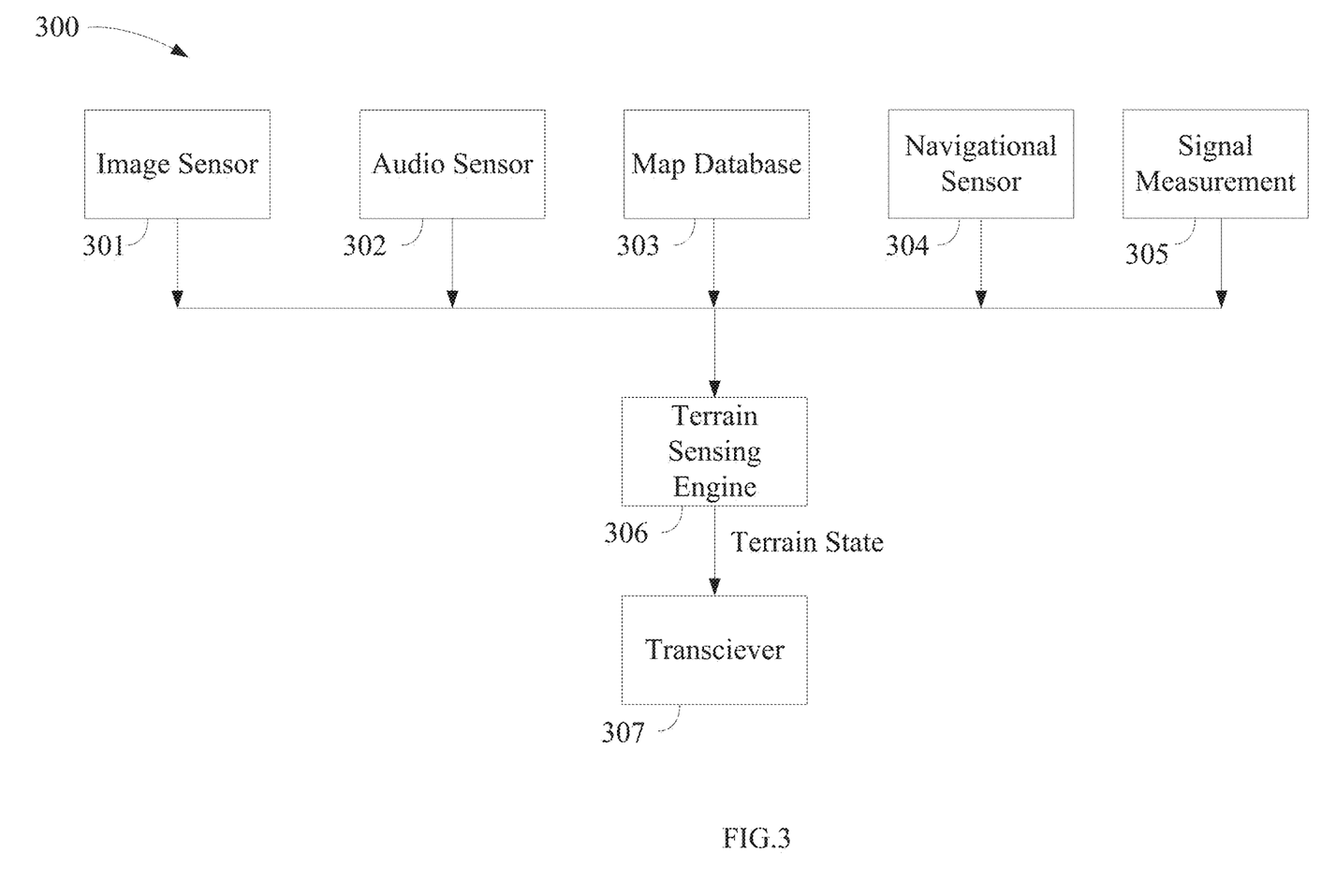
FIG. 3 is a block diagram of an example mobile device or user equipment in an embodiment.

FIG. 3 is a block diagram of an example mobile device or user equipment in an embodiment. The mobile device 300 is shown comprising image sensor 301, audio sensors 302, map database (Map data) 303, navigational sensors 304, signal measurements 305, terrain sensing engine 306 and transceiver 307. Each block is further described below.

The image sensor 301 captures the images of the surrounding in which the mobile device is operated. For example, image sensor 301 may capture still images at a regular interval or may capture continuous movie (video). Such intervals and continuity may be determined and/or adjusted based on the determination of the terrain and/or other conditions and signals received from other sensors. The images and/or sequence of images are provided to the terrain sensing engine 306 for determining the terrain. The image sensor may comprise camera, video camera, thermal imaging camera and other imaging devices.

The audio sensors 302 capture the sounds and audio signals from the surrounding in which the mobile device is operated. For example, audio sensor 301 may capture conversation, ambient sound, at a regular interval or may capture continuous audio recording. Such intervals and continuity may be determined and/or adjusted based on the determination of the terrain and/or other conditions and signals received from other sensors. The samples of ambient sound and/or continuous track of sounds are provided to the terrain sensing engine 306 for determining the terrain. The audio sensor may comprise microphone, stereo microphone, and other sound sensing devices.

The map data 303 comprises the geographical maps of the area with road, terrain, buildings, etc. the map data represent a database storing the map information. In one embodiment, map data 303 may comprise local storage/database on the mobile device 300. Alternatively, the map data 303 may comprise a database/storage on a remote server connected through various communication links.

The navigational sensors 304 determine position and location of the mobile device 300. The navigation sensor may comprise, inertial measuring units (IMU) such as magnetometer, gyroscope, accelerometer and geographical positioning systems operative to determine the position based on the signal received from the satellite systems such as NAVSTAR, Galileo, GLONASS, IRNSS, for example. In one embodiment, the navigational sensor may provide the position information as latitude and longitude to the terrain sensing engine 306.

The signal measurements 305 measures signals of the communication link and determine the quality of the signal. For example, the signal measurement 305 may measure, signal strength, bit error rate and other parameters that may determine the quality of communication and link.

The terrain sensing engine 306 engine determines the terrain state (for example type of terrain, surrounding conditions) of the mobile device by employing one or more data received from the image sensor 301, audio sensors 302, map data 303, navigational sensors 304, signal measurements 305. The terrain sensor may attach varying degree of importance to the signal received from each sensor. For example, in one embodiment, the terrain sensing engine 306 may attach higher degree of importance to the data received from the sensor that is more reliable compared to other at any given time. In yet another embodiment, the terrain sensing engine 306 may employ adaptive learning technique to determine the terrain state at any given time. The terrain state determined is provided to the transceiver 307. For example the terrain state determined by the terrain sensing engine 306 may provide data bits embedded in the protocol packets for transmission to base station 130.

The transceiver 307 operates to transmit and receive the data to and from base station 110 using the applicable protocol. The transceiver 307 may be implemented to incorporate protocol in conjunction with the protocol of the respective base station. The manner in which the terrain sensing engine 306 may be implemented to adaptively learn and determine the terrain state more accurately is further described below.

Figure 4:
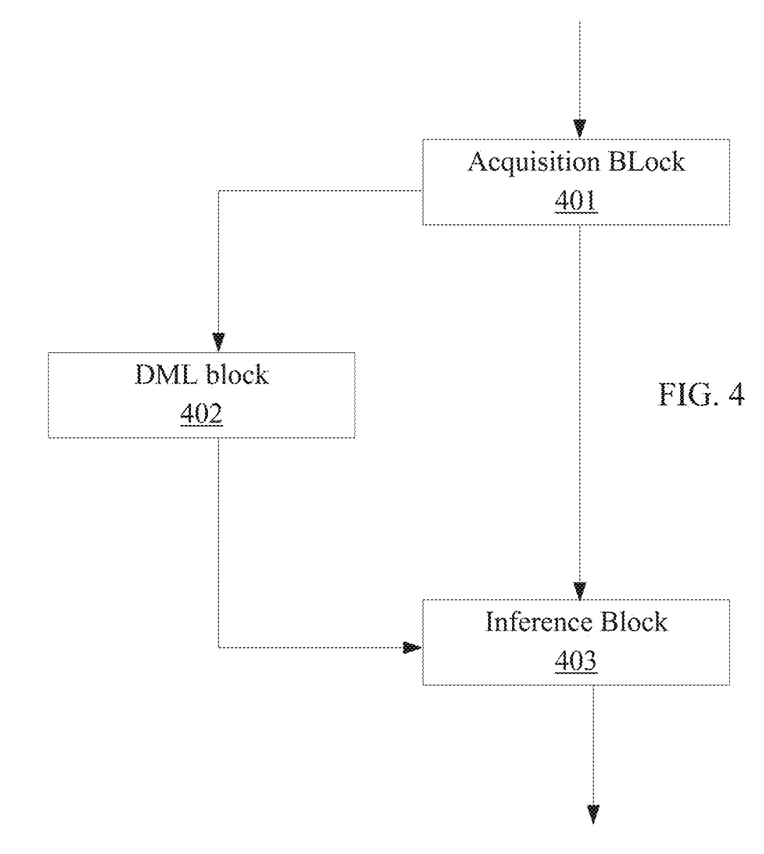
FIG. 4 is a block diagram illustrating an example the terrain sensing engine in one embodiment.

FIG. 4 is a block diagram illustrating an example terrain sensing engine in one embodiment. The terrain sensing engine is shown comprising data acquisition block 401, distributed machine learning (DML) block 402 and inference block 403. Each block is further described below.

The data acquisition block 401 acquires data from multiple sources and sensors. In one embodiment, the data acquisition block 401 may be interfaced to the image sensor 301, audio sensors 302, map data 303, navigational sensors 304, and signal measurements 305. The data acquisition block 401 may operate to convert the data from each sensor to desired format or packets with timing reference that is compatible with the distributed machine learning (DML) block 402 and inference block 403.

The data acquisition block 401 may comprise signal conditioner that may perform filtering, amplification, analog to digital conversion and other signal stabilisation operations to the signals received from the sensors. Further, the data acquisition block 401 may comprise processor to operate on the data received from the sensors to store and provide the data in a suitable format. The data acquisition block 401 may also comprise a buffer to store the data with time references of the data received. The acquired data from each sensors and databases are provided to machine learning (DML) block 402 and inference block 403.

The distributed machine learning (DML) block 402 and inference block 403 operate on the data received from the data acquisition block 401. The DML block 402 and inference block 403 perform analysis and characterisation of each sensor data acquired at the data acquisition block 401. The data analysis and characterisation includes refinement, classification and clustering and weighted decision. In that, a combination of supervised and reinforcement learning tools are deployed to predict the terrain states. In one embodiment, a machine learning techniques are employed to determine the terrain state thereby optimize connectivity to the cellular network. The machine learning techniques progressively employ training sequence that uses large collection of labelled data (training data) to arrive at an inference rule also referred to as the model.

In an embodiment, the DML block 402 may operate in two phases, training and prediction. In the training phase, the data acquired is a training data, this is used to derive the classifiers and set up the inference rules. In the prediction phase, the terrain state is predicted on the data acquired based on inference rules or model.

The process of learning from data in combination with rules defined forms machine learning. The model learned through machine learning is then applied to unlabeled data samples to infer the labels. Machine learning aims to improve performance by experience. The terrain sensing comprises training and a prediction phase. Both the phases use data acquisition, classification and inference.

The initial training part employs supervised learning. The DML block 402 may employ known models and labels that can support the estimation of the unknown parameters, which in this case are the terrain states. The sensing method switches to a dynamic iterative learning (reinforcement learning) procedure after a warm-up time. Deep learning based RNNs (Recurrent Neural Network), where the output not only depends on the current observations but also on the formerly available inferences are employed to arrive at the terrain state classifications.

For example, the data acquired through image sensors 301 may comprise the terrain image that have rich information and may be employed to classify images by analyzing the statistical texture and wavelet features of terrain images. The texture and wavelet features may be extracted and employed for training to obtain the classifier. Similarly, the data acquired through audio sensors may be classified using Gaussian mixture models or feed-forward neural networks (FFNN) model. In one embodiment, map (meta) data is stored as a vector Geodata having attributes corresponding to physical vector data themes. For example, the map meta data may comprise terrain labels and themes that may be employed for DML analysis and classification. In one embodiment, DML block 402 analyzes the data, uses appropriate learning models to derive the inference rule and adapts the inference rule as more data is acquired on the go. As a result, a instantaneous random terrain decision are smoothed over a desired time interval using machine learning to provide the better terrain state resulting in an improved throughput. The manner in which the DML may smoothen the terrain sensing data to provide more accurate terrain state is further described below. The inference block 403 determines the terrain state based on the recommendation received from the DML 402 and data acquisition block 401. The state thus, inferred is provided to the transceiver for transmission to base station.

Figure 5:
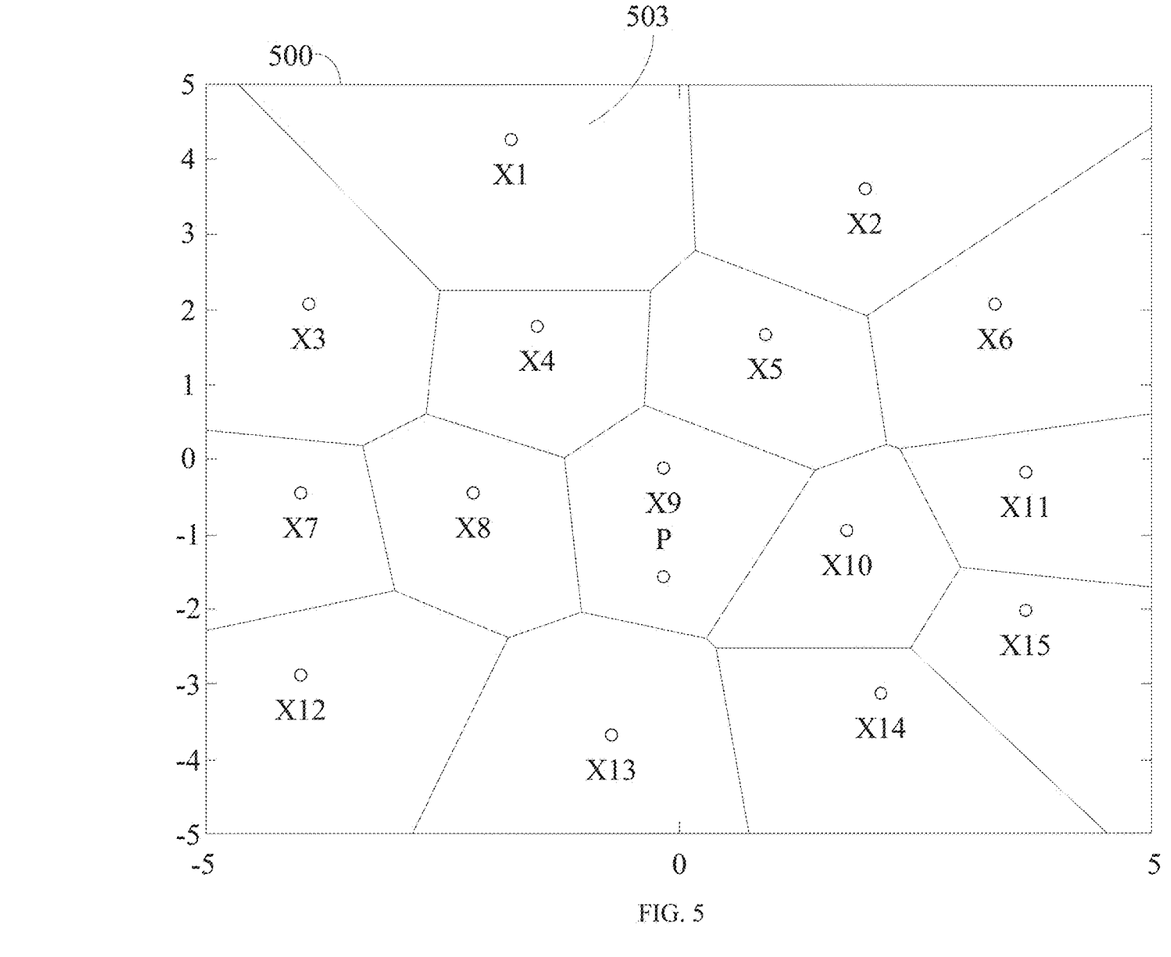
FIG. 5 illustrates Poisson-Voronoi cellular networks 500 as an example of machine learning in an embodiment.

In one embodiment, the terrain sensing engine of FIG. 4 may operate in two phases; training and prediction. In the training phase, the data acquired is a training data (for example a known terrain data). This training data may be employed by the terrain sensing engine to derive the classifiers and setup one or more inference rules (may be deployed as part of the inference block). In the prediction phase, the terrain state is predicted on the real time data acquired based on the inference rules. As described above, the data acquired for terrain classification can be from one or multiple sources (as in FIG. 3). For example, it can be based on radio signal measurements, sensor data from image and audio sensors or map meta-data available from navigation maps. For each type of data acquired, analysis and characterization is carried out and inference rule is derived as a weighted function of the derived classifications. The terrain sensing engine may employ a combination of supervised and reinforcement learning tools to predict the terrain states. The initial training part uses supervised learning which relay on known models and labels that may support the estimation of the unknown parameters, which in this case are the terrain states. The engine then switches to a dynamic iterative learning (Reinforcement learning) procedure after a warm-up time. Deep learning based RNNs (Recurrent Neural Network), where the output not only depends on the current observations but also on the formerly available inferences are used to arrive at the terrain classifications. For data acquired through image sensors, the terrain image has rich information, and it can be used to classify images by analyzing the statistical texture and wavelet features of terrain images. Extreme Learning Machine (ELM), a simplified variant of a feed-forward neural network, supports a fast and simple training process and is robust. The texture and wavelet features are extracted and used for training to obtain the classifier. For data acquired through audio sensors one can use Gaussian mixture models or feed-forward neural networks (FFNN). Map metadata is stored as vector geodata which has attributes corresponding to physical vector data themes FIG. 5 illustrates Poisson-Voronoi cellular networks 500 as an example of machine learning in an embodiment. In that, each cell, for example 503 (x1 through x15), is randomly attributed/represents one of an urban, rural, forest or desert terrain. A user traverses path may be selected across the network to create. For example users (UE 110) may move across or traverse the path and corresponding periodic observations (sensor data and/or measurements) are fed to the DML block 402 and inference block 403. The DML block 402 analyzes the data, uses learning models described above or any known learning model to derive the inference rule and adapts the inference rule as more data is acquired progressively. The DML block 402 updates the terrain states at a regular interval.

Figure 6A:
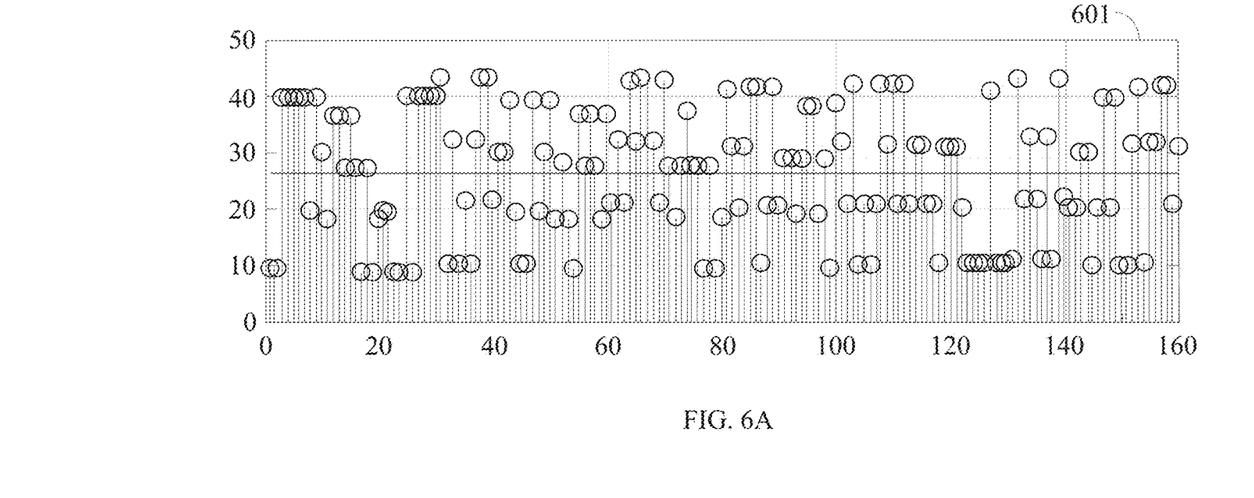
FIG. 6A is an example plot depicting the average throughput when terrain states are provided to the base station from the UE 110 without employing DML block 402.
Figure 6B:
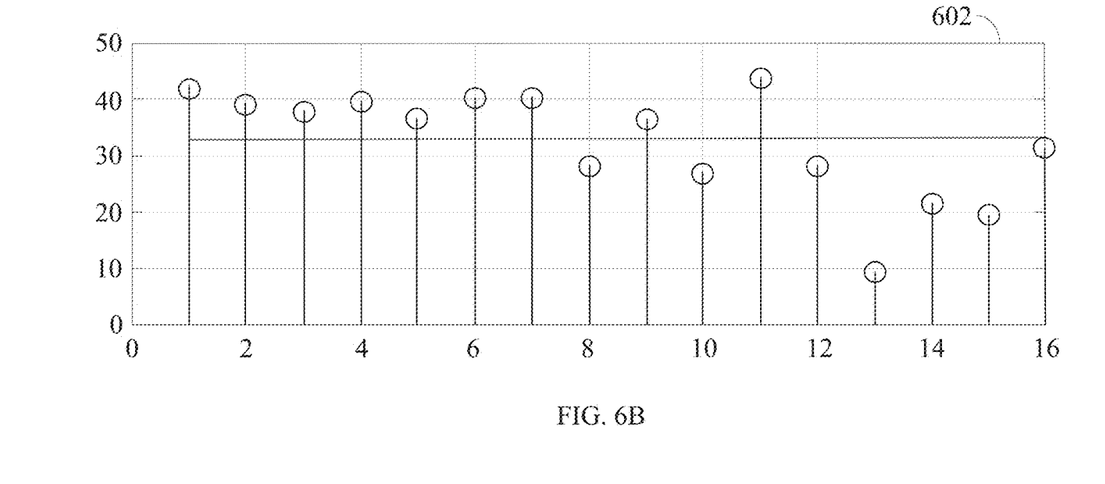
FIG. 6B is an example plot depicting the average throughput when terrain states are provided to the base station from the UE 110 employing DML block 402.

FIG. 6A is an example plot depicting the average throughput when terrain states are provided to the base station from the UE 110 without employing DML block 402. In that, the terrain decision is made for every sample instance. The sample instance indicates the data sampled from the sensors. Accordingly, the throughput is shown as less than 30 MBPS (Average throughput). FIG. 6B is an example plot depicting the average throughput when terrain states are provided to the base station from the UE 110 employing DML block 402. In that, the terrain decision is made considering the 10 samples (after accumulating the 10 samples). Accordingly, the throughput is shown as greater than 30 MBPS (Average throughput). The plot 602 shows the average throughput (Mbps) with machine learning based terrain system and plot 601 shows the average throughput (Mbps) without learning based terrain system.

The average throughput is 601 derived based on the fine granularity terrain sense states, which optimizes the weights from the course granularity terrain states over an interval of 10 observations or measurement intervals. For example, with the observation interval (set to) of 10 msec, it is observed that, a significant improvement (20-25%) in the average throughput may be achieved with learning based terrain state determination.

Figure 7:
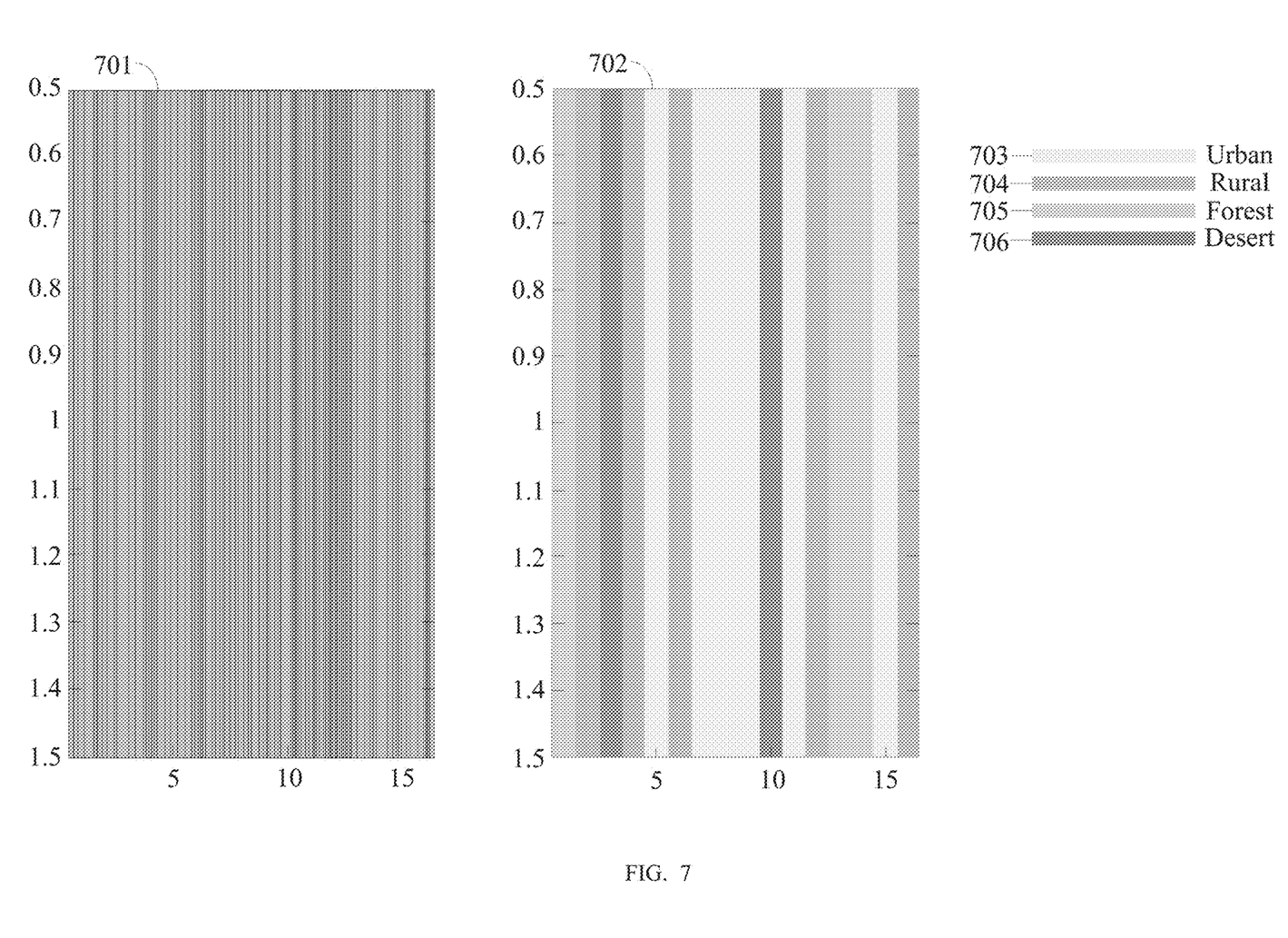
FIG. 7 depicts sub plots of course and fine terrain sense states.

FIG. 7 depicts sub plots of course and fine terrain sense states. Reference 703 through 706 indicates different cell divisions, (urban, rural, forest and desert) and 701 is Sub-plot showing the course granularity of the terrain states, and 702 is the sub-plot showing the fine granularity of the terrain states. The fine granularity is obtained by optimizing the weights and inference rule dynamically.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A mobile device capable of communicating with a base station using a communication mode from plurality of communication modes comprising:
   a set of sensors configured to provide a data representing a terrain condition of the mobile device;
   a distributed machine learning engine determining a first terrain state at regular interval based on a current data and a past data received from the set of sensors; and
   an inference unit determining a second terrain state of the mobile device from the current data and the first terrain state,
   wherein, the base station allocating the communication mode from plurality of communication modes based on the second terrain state.

2. The mobile device of claim 1, wherein the set of sensor comprising a camera providing a sequence of images, a audio sensor providing sound information, a signal measurement device providing signal strength information, a position sensor providing a geographical position information and a geo data providing map information, in that distributed machine learning engine employing the sequence of images, sound information and position information to determine the terrain state.

3. The mobile device of claim 2, wherein the distributed machine learning engine is configured to operate in two phases, a training and a prediction phase, wherein in the training phase a known terrain and a known sequence of images, a known sound information and a known position information are provided to generate a set of inference rule and a set of classification labels, and the distributed machine learning engine configured to apply the set of inference rule and the set of classification labels to a sequence of images, a sound information and a position information to determine the terrain state in the prediction phase.

4. The mobile device of claim 3, wherein the communication mode comprising a first frequency and a second frequency resources.

5. The mobile device of claim 4, wherein the communication mode further comprising a selection mode may comprises various transmission modes including, SISO, transmit diversity, Open-loop and closed-loop spatial multiplexing, MU-MIMO, pre-coding and a beam forming.

* * * * *